(12) United States Patent
Smith et al.

(10) Patent No.: US 8,909,218 B2
(45) Date of Patent: Dec. 9, 2014

(54) VERY FAR-FIELD COMMUNICATION

(71) Applicant: Verizon Patent and Licensing Inc., Basking Ridge, NJ (US)

(72) Inventors: Tracy J. Smith, Bothell, WA (US); Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 42 days.

(21) Appl. No.: 13/690,675

(22) Filed: Nov. 30, 2012

(65) Prior Publication Data

US 2014/0155059 A1   Jun. 5, 2014

(51) Int. Cl.
*H04W 4/00* (2009.01)
*G08B 1/08* (2006.01)
*G01S 3/02* (2006.01)
*H04W 4/06* (2009.01)
*H04L 29/06* (2006.01)
*H04W 4/24* (2009.01)
*H04L 12/24* (2006.01)

(52) U.S. Cl.
CPC .............. *H04W 4/06* (2013.01); *H04W 4/008* (2013.01); *H04L 69/14* (2013.01); *H04L 41/0803* (2013.01); *H04W 4/24* (2013.01)
USPC ................ 455/426.1; 340/539.13; 340/10.51; 342/450

(58) Field of Classification Search
USPC ........................................ 455/426.1
See application file for complete search history.

(56) References Cited

U.S. PATENT DOCUMENTS

| | | | |
|---|---|---|---|
| 8,159,329 B1 * | 4/2012 | Killian et al. | 340/8.1 |
| 2009/0027170 A1 * | 1/2009 | Amir | 340/10.31 |
| 2009/0153402 A1 * | 6/2009 | Doh et al. | 342/450 |
| 2009/0251295 A1 * | 10/2009 | Norair et al. | 340/10.51 |
| 2010/0253520 A1 * | 10/2010 | Lauronen | 340/572.1 |
| 2011/0156640 A1 * | 6/2011 | Moshfeghi | 320/108 |
| 2011/0227726 A1 * | 9/2011 | Lee | 340/539.13 |

* cited by examiner

*Primary Examiner* — Opiribo Georgewill
*Assistant Examiner* — William Nealon

(57) ABSTRACT

A network device receives, from a user device, an inquiry for a selected very-far field communication (VFC) tag and selects, from a group of available base stations, one or more particular base stations of a wireless access network from which to broadcast a tag query for the selected VFC tag. The network device inserts the tag query into a broadcast signal of each of the one or more particular base stations. The VFC tag receives the tag query and transmits a local response signal over a local wireless network. A mobile device within range of the local response signal processes the local response signal and forwards the local response signal to the network device as a tag response. The network device receives the tag response and sends an indication of the tag response to the user device.

20 Claims, 8 Drawing Sheets

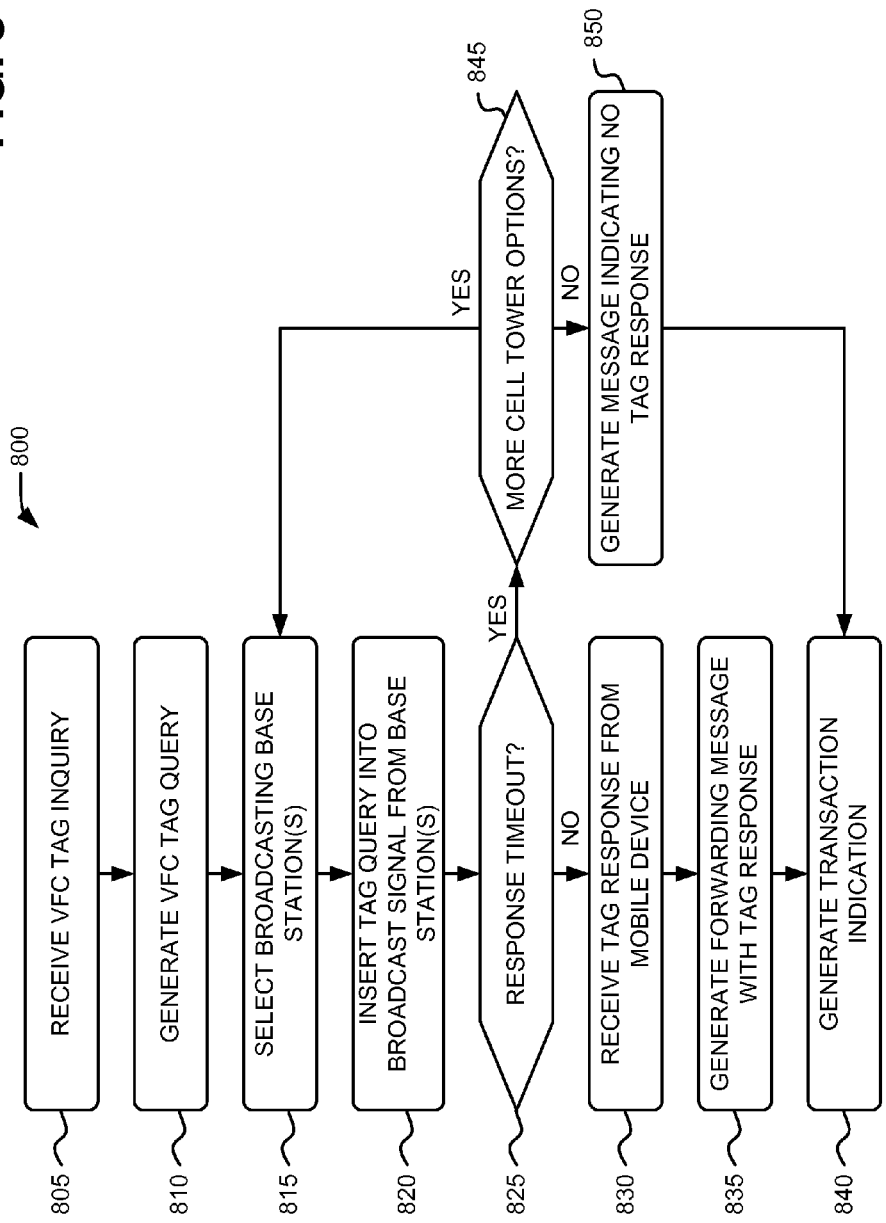

VERY FAR-FIELD COMMUNICATION

BACKGROUND

Near field communication (NFC) protocols may be used to establish wireless communication between devices in close proximity (e.g., less than 5 centimeters apart). Far field communication (FFC) protocols may be used establish wireless communication between devices at greater distances. Using FCC protocols, tags, such as radio frequency identification (RFID) tags, containing electronically-stored information can be 'read' by devices (e.g., 'readers') that detect radio waves emitted from the tag. For example, at UHF frequencies, FFC protocols may be used to interrogate RFID tags within a coverage area of up to 30 meters from an RFID reader. However, features of FFC protocols are not available at very far distances (e.g., more than 30 meters, such as several miles or more).

BRIEF DESCRIPTION OF THE DRAWINGS

FIG. 8 is a flow chart of an exemplary process for locating a tag over very far distances according to an implementation described herein.

DETAILED DESCRIPTION OF PREFERRED EMBODIMENTS

The following detailed description refers to the accompanying drawings. The same reference numbers in different drawings may identify the same or similar elements.

Systems and methods described herein may employ multiple wireless networks to perform tag interrogations at extended distances. In one implementation, a system may include a very-far field communication (VFC) tag, a mobile device, and a remote VFC server device. The VFC server may receive a tag inquiry from a requesting device and may select, from a group of available base stations, a particular base station of a wireless access network (e.g., a cellular network) from which to broadcast a tag query for the VFC tag. The VFC server may cause the tag query to be inserted into a broadcast signal associated with the particular base station. The VFC tag may include a receiver to listen for the tag query and a transmitter to provide a local signal, in response to the tag query, over a local wireless network (e.g., a WiFi network). The mobile device (e.g., a smart phone with a VCF application) may be configured to receive the local signal from the VFC tag, and send a tag response, based on the local signal, to the VFC server. The VFC server may receive the tag response from the mobile device and may send an indication of the tag response to the requesting device.

Figure 1:
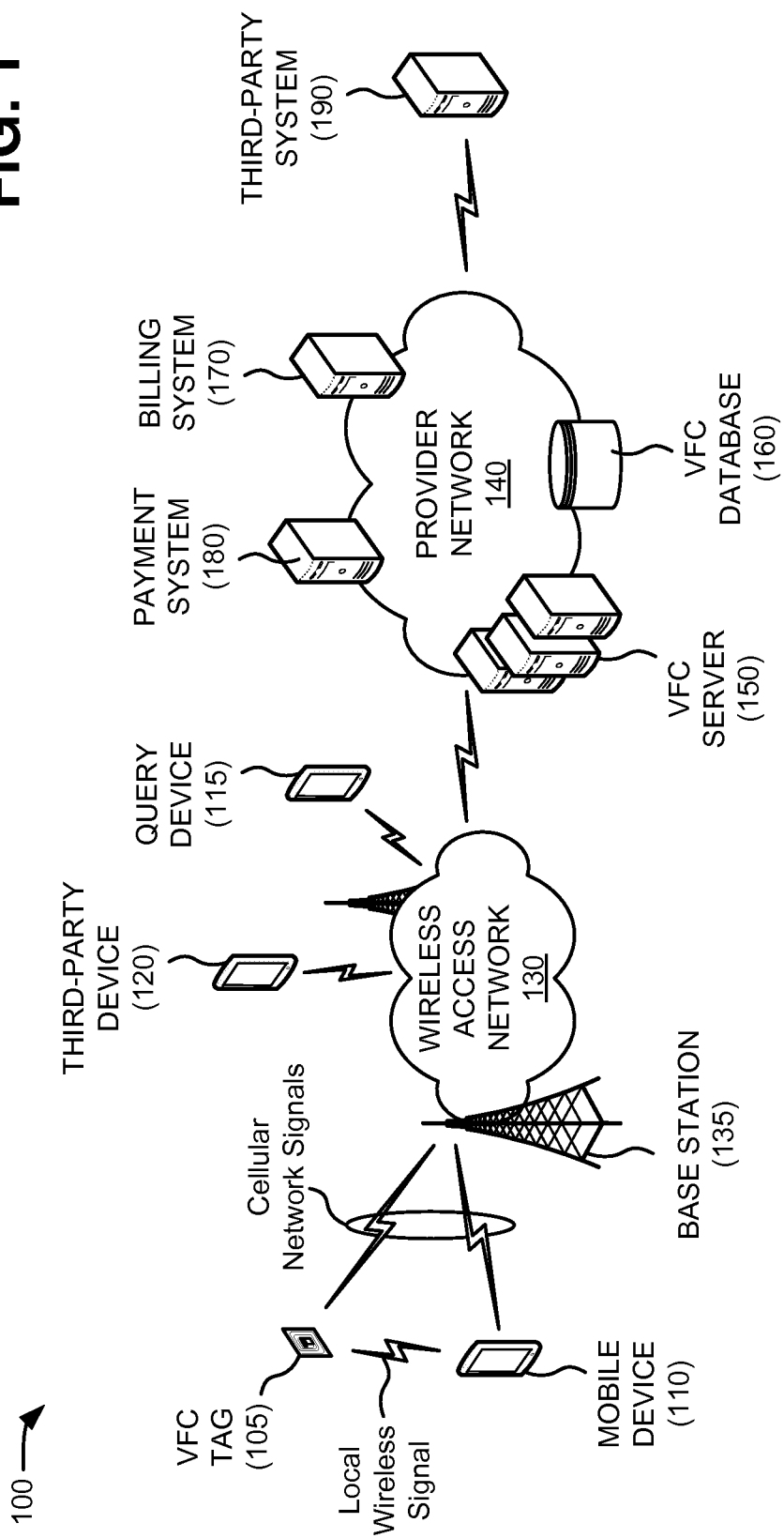
FIG. 1 depicts an exemplary network in which systems and/or methods described herein may be implemented.

FIG. 1 is an exemplary network 100 in which systems and/or methods described herein may be implemented. As illustrated, network 100 may include a VFC tag 105; mobile device 110; a query device 115; a third-party device 120; a wireless access network 130 with a based station 135; a provider network 140 that includes a VFC server 150, a VFC database 160, a billing system 170, and a payment system 180; and a third-party system 190. Components of network 100 may be connected via wired and/or wireless links.

VFC tag 105 may include an active tag with an integrated circuit to provide a unique identifier (e.g., a unique serial number) upon receiving an interrogation request. VFC tag 105 may be attached to an item, such as an item to be tracked or inventoried. VFC tag 105 can be interrogated via a cellular network frequency from access network 140 and may respond to interrogation signals using local wireless network signals, such as WiFi (e.g., IEEE 802.11x standards) or Bluetooth (e.g., IEEE 802.15 standards) networks. As described further herein, VFC tag 105 may include a timing component to listen for interrogation signals at select intervals.

Mobile device 110 may include a device capable of receiving signals via a local wireless network and communicating over a wireless access network (e.g., wireless access network 130). For example, mobile device 110 may include a computational and/or communicational device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a computer (e.g., personal computer, a laptop computer, or a tablet computer), a global positioning system (GPS) device, a gaming device, etc. In implementations described herein, mobile device 110 may be provided with a VFC application that listens for VFC tag responses (e.g., from VFC tag 105) over a local wireless network and transmits the tag responses to VFC server 150.

Query device 115 and third-party device 120 may each include a mobile device or a stationary device that is capable of communicating with VFC server 150. Query device 115 may generally be used to initiate a tag inquiry for VFC tag 105 and receive a tag response. Third-party device 120 may generally be used to receive a copy of the tag response. In one implementation, query device 115 and third-party device 120 may be the same as or similar to that of mobile device 110. In another implementation, query device 115 and/or third-party device 120 may include an Internet-enabled device such as a computer workstation, desktop computer, or another networked device.

Wireless access network 130 may include a wireless communications network that connects subscribers (e.g., mobile device 110) to a service provider (e.g., provider network 140). In one example, access network 130 may include a long-term evolution (LTE) network. In other implementations, access network 130 may employ other wireless network standards such as Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or future wireless access network standards.

Wireless access network 130 may include a base station 135. Base station 135 may include one or more devices that receive data from VFC server 150 and transmit that data to VFC tag 105 via an air interface. Base station 135 may also include one or more devices that receive voice and/or data from mobile device 110 over the air interface and transmit that voice and/or data to VFC server 150. In implementations described herein, base station 135 may selectively broadcast VFC tag query symbols (e.g., upon request from VFC server 150).

Provider network 140 may include network devices that provide a backend support system for facilitating VFC services. For example, provider network 140 may distribute VFC interrogation requests, process tag responses, and generate transaction records. Provider network 140 may also permit mobile device 110 to download a VFC application (e.g., VFC application 500 described below) to enable collection receiving and forwarding of responses from VFC tag 105. Provider network 140 may include, for example, one or more private Internet Protocol (IP) networks that use a private IP address space. Provider network 140 may include a local area network (LAN), an intranet, a private wide area network (WAN), etc. In one implementation, provider network 140 may implement one or more Virtual Private Networks (VPNs) for providing communication between devices within provider network 140. Provider network 140 may be protected/separated from other networks by a firewall. Although shown as a single element in FIG. 1, provider network 140 may include a number of separate networks.

VFC server 150 may include one or more network devices, or other types of computation or communication devices (e.g., an application server device, a personal computer, a laptop computer, etc.), to manage VFC inquiries. VFC server 150 may, for example, receive VFC tag inquiries from query device 115. In another implementation, query device 115 may be used to configure periodic (e.g., automatic) tag interrogations by VFC server 150. VFC server 150 may identify base station(s) 135 from which to send interrogations, receive tag responses (e.g., forwarded from mobile device 110), and distribute tag responses. VFC server 150 may receive and apply configuration settings for handling VFC tag inquires, such as general/default locations, associations of VFC tags/mobile devices 110, reporting rules, etc. The configuration settings may be stored in and retrieved from, for example, VFC database 160.

VFC database 160 may include a database or another data structure to store data pertaining to the VFC system. VFC database 160 may store, for example, registration information, configuration settings, and transaction data for VFC inquiries. In one implementation, VFC database may also include historical records for tracked VFC tags 105.

Billing system 170 may include one or more network devices, or other types of computation or communication devices, that gather, process, search, and/or provide information in a manner described herein. In an exemplary implementation, billing system 170 may receive transaction information (regarding VFC interrogations) or indication of a billing event from VFC server 150. Billing system 170 may maintain billing information for subscribers to the VFC services and other services of available through provider network 140.

Payment system 180 may include one or more network devices, or other types of computation or communication devices to conduct financial transactions based on VFC tag interrogations. Payment system 180 may include, for example, a mobile payment system. Payment system 180 may, for example, receive indications of particular VFC tag responses from VFC server 150 and apply payments based, for example, on previous agreements with third-parties.

Third-party system 190 may include one or more network devices, or other types of computation or communication devices that support third-party activities. Third-party system 190 may support, for example, inventory-based ventures, rental programs, or other business that may incorporate use of VFC tag information.

In implementations described herein, VFR tag 105 may first be registered with VFC server 150, and query device 115 may provide a tag inquiry to VFC server 150. VFC server 150 may identify one or more base stations 135 from which to broadcast a tag interrogation and forward the tag interrogation though the base station(s) 135 to VFC 105. VFC 105 may receive the tag interrogation signal and respond by transmitting a VFC tag response via a local wireless signal. Mobile device 110 (e.g., within the range of the local wireless signal) may receive the VFC tag response and may forward the VFC tag response back to VFC server 150 (e.g., via base station 135 or another network connection). VFC server 150 may receive the VFC tag response and forward the VFC tag response to query device 115. In one implementation, VFC server 150 may provide a transaction indication and/or copy of the VFC tag response to one or more of third-party device 120, billing system 170, payment system 180, or third-party system 190.

In FIG. 1, the particular arrangement and number of components of network 100 are illustrated for simplicity. In practice there may be more VFC tags 105, mobile devices 110, query devices 115, third-party devices 120, wireless access networks 130, base stations 135, provider networks 140, and/or third-party systems 190. For example, there may be thousands of VFC tags 105 and mobile devices 110.

Figure 2:
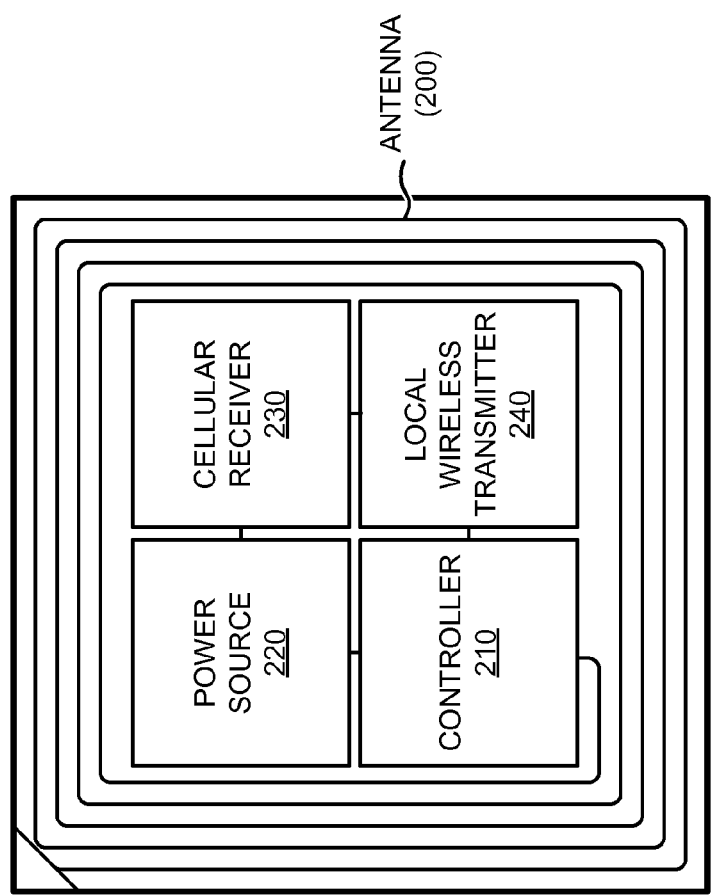
FIG. 2 is a simplified schematic of an exemplary very far-field communication (VFC) tag of the network of FIG. 1.

FIG. 2 is a simplified schematic of an exemplary VFC tag 105. VFC tag 105 may include an antenna assembly 200, a controller 210, a power source 220, a cellular receiver 230, and a local wireless transmitter 240.

Antenna assembly 200 may include one or more antennas to transmit and/or receive RF signals over the air. Antenna assembly 200 may, for example, receive cellular band RF signals over the air and provide them to cellular receiver 230. Additionally, antenna assembly 200 may receive local wireless band RF signals from local wireless transmitter 240 and transmit them over the air.

Controller 210 may manage cycling of cellular receiver 230 and local wireless transmitter 240 to minimize consumption of power source 220. For example, controller 210 may employ a periodic listening windows for cellular receiver 230 (e.g., one minute active, four minutes off) to extend a lifecycle of power source 220. Controller 210 may be configured to recognize a VFC interrogation signal (e.g., from VFC server 150) and may only power up local wireless transmitter 240 when a VFC interrogation signal is recognized.

Power source 220 may include one or more batteries or another power supply used to supply power to components of VFC tag 105. Power source 220 may include, for example, rechargeable or disposable batteries.

Cellular receiver 230 may include a receiver that may convert RF signals to baseband signals. Cellular receiver 230 may receive the cellular RF signals via antenna 200. Cellular receiver 230 may provide a listening capability for VFC tag 105 to receive tag interrogations over one or more cellular frequency bands.

Local wireless transmitter 240 may include a transmitter that may convert baseband signals to radio frequency (RF) signals. Local wireless transmitter 240 may be coupled to antenna 200 for transmission the RF signals. Local wireless transmitter 240 may provide transmission capability for VFC tag 105 to send tag responses over a local wireless network frequency (e.g., IEEE 802.11x or IEEE 802.15 standards).

Although FIG. 2 shows exemplary components of VFC tag 105, in other implementations, VFC tag 105 may contain fewer, different, differently-arranged, or additional components than depicted in FIG. 2.

Figure 3:
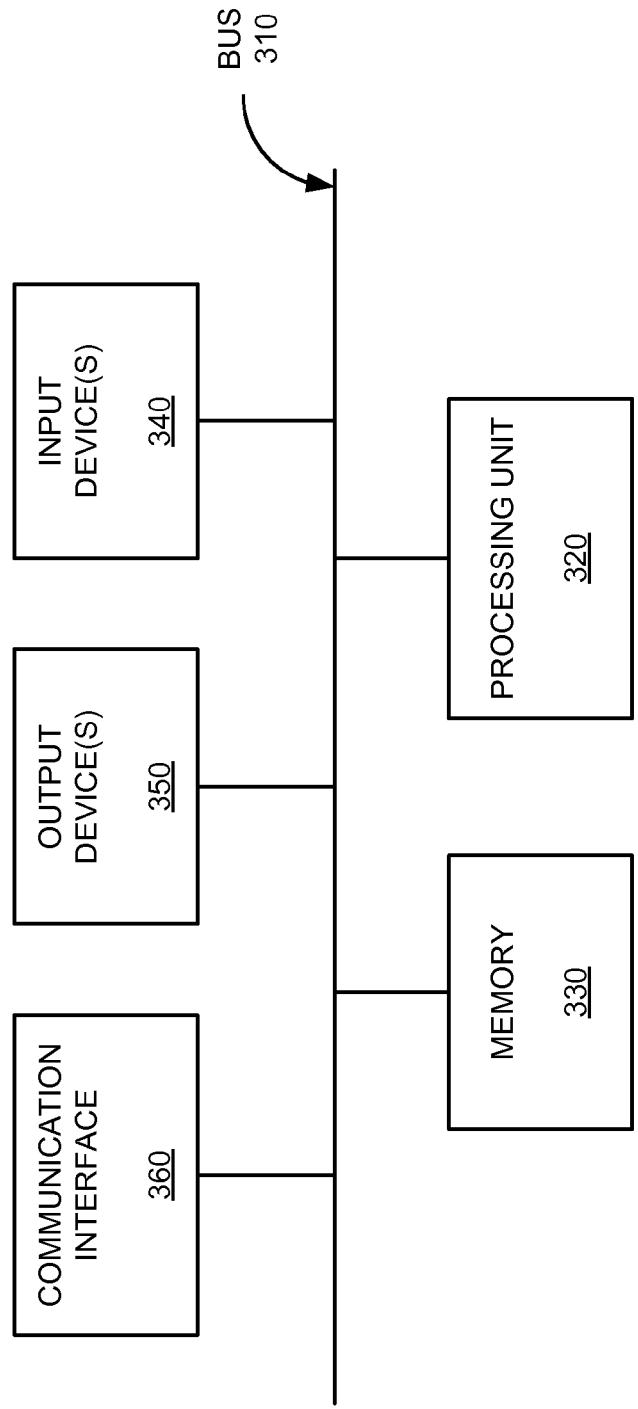
FIG. 3 is a diagram of exemplary components of one of the devices of the network of FIG. 1.

FIG. 3 is a diagram illustrating exemplary components of a device 300. Each of user mobile device 110, query device 115, third-party device 120, VFC server 150, billing system 170, payment system 180, and third-party system 190 may be implemented/installed as a combination of hardware and software on one or more of device 300. As shown in FIG. 3, device 300 may include a bus 310, a processing unit 320, a memory 330, one or more input devices 340, one or more output devices 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions stored in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
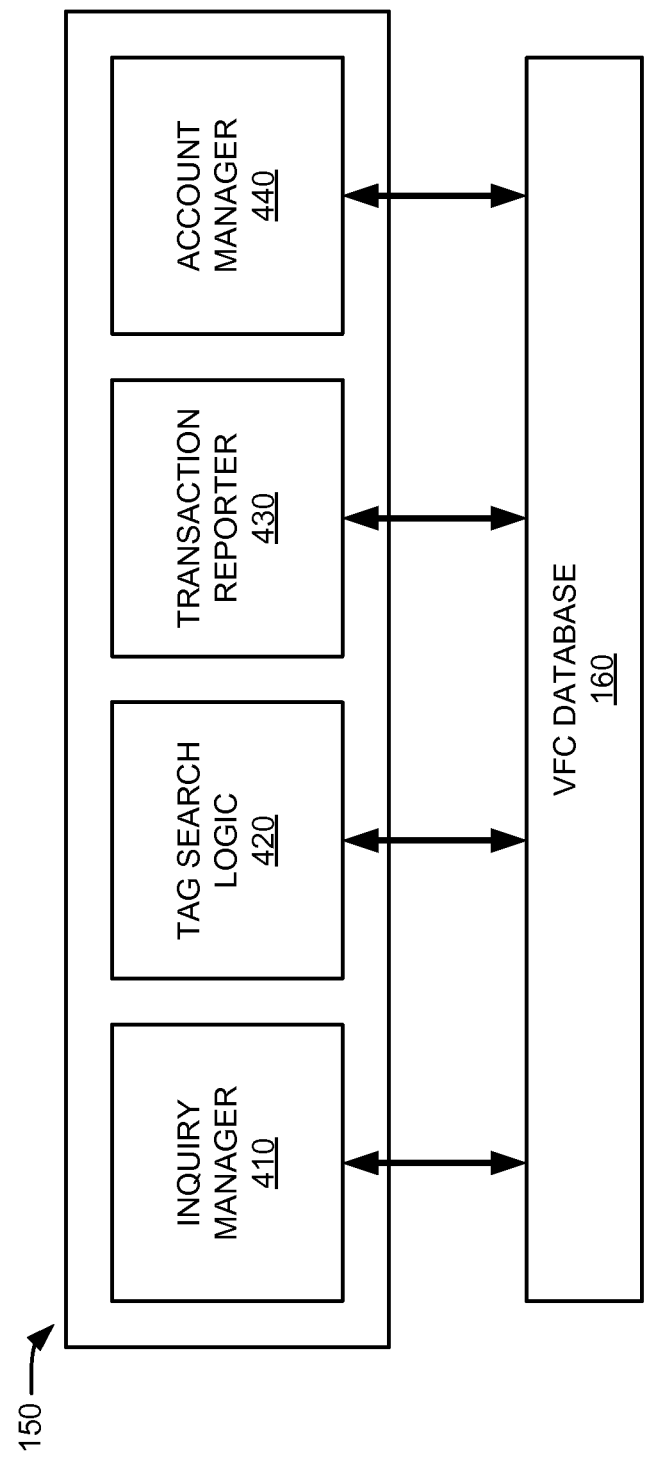
FIG. 4 is a diagram of exemplary functional components of a VFC server of the network of FIG. 1.

FIG. 4 is a diagram of exemplary functional components of VFC server 150. The functional component may be implemented by, for example, processing unit 320 in conjunction with memory 330. As shown in FIG. 4, VFC server 150 may include an inquiry manager 410, tag search logic 420, a transaction reporter 430, and an account manager 440.

Inquiry manager 410 may receive tag inquiries (e.g., from query device 115). Tag inquiries may include, for example, a particular VFC tag number from which a response is requested. Inquiry manager 410 may receive a tag inquiry in one of a variety of formats, such as a short message service (SMS) message, an instant message, an email, a session-based query (e.g., a TCP/IP session with query device 115), or anther format. Inquiry manager 410 may consult tag search logic 420 to determine a broadcasting base station (e.g., base station 135) associated with the requested VFC tag number. Inquiry manager 410 may initiate broadcast of a general VFC interrogation symbol from base station 135.

In one implementation inquiry manager 410 may also determine an active listening window for VFC tag 105. The listening window may be determined, for example, based on scheduling information determined, for example, as part of a tag registration process for VFC tag 105. In one implementation, VFC database 160 may locally store listening windows for VFC tags and inquiry manager 410 may track the active listening window so as to send tag query signals during an active listening window of a particular VFC tag 105.

Inquiry manager 410 may receive a VFC tag response, as forwarded from mobile device 110. In one implementation, inquiry manager 410 may confirm that a particular VFC tag response is responsive to a particular tag inquiry (e.g., confirm a tag identifier for the response matches the tag inquiry). Assuming the VFC tag response is responsive, inquiry manager 410 may consult VFC database 160 to determine forwarding instructions for the VFC tag response and may provide the VFC tag response to, for example, query device 115, third-party device 120, and/or third-party system 190 based on the forwarding instructions.

Tag search logic 420 may determine a particular base station 135 or group of base stations 135 that can be used to send interrogation symbols for a particular VFC tag 105. Tag logic 420 may, for example, apply past location data or other registration information to determine a most probable base station 135 (or group of base stations 135) for an initial broadcast interrogation and for subsequent interrogations. Subsequent interrogations may be used, for example, if no response is received after an initial interrogation. In one implementation, tag logic 420 may iteratively increase the number of base stations 135 used to locate VFC tag 105 until a widest scope of coverage (e.g., national, worldwide, etc.) is achieved. For example, tag logic 420 may recommend an interrogation plan that queries from a single base station 135, then (e.g., after a set waiting period) repeats the query from a set of local base stations 135, and then again repeats the query from a regional or national set of base stations 135. Tag search logic 420 may provide base station recommendations to inquiry manager 410.

Transaction reporter 430 may detect instances of VFC tag interrogations and/or VFC tag responses and may provide indications to, for example, billing system 170, payment system 180, or third-party system 190. In one implementation, transaction reporter 430 may log transaction instances in VFC database 160. For example, transaction reporter 430 may log multiple transactions and report cumulative transactions on a periodic basis.

Account manager 440 may associate particular accounts with particular VFC tags. For example, account manager 440 may receive tag registration information (e.g., from third-party device 120 or another device) to provide particular devices and/or accounts (e.g., email accounts, phone numbers, etc.) that may receive responses to tag inquiries for particular VFC tags. In another implementation, account manager 440 may receive tag registration information that associates a particular VFC tag 105 with a particular tagged item (e.g., an item to which VFC tag 105 is attached). Account manager 440 may store tag registration information in, for example, VFC database 160.

Although FIG. 4 shows exemplary functional components of VFC server 120, in other implementations, VFC server 120 may contain fewer, different, or additional functional components than depicted in FIG. 4.

Figure 5:
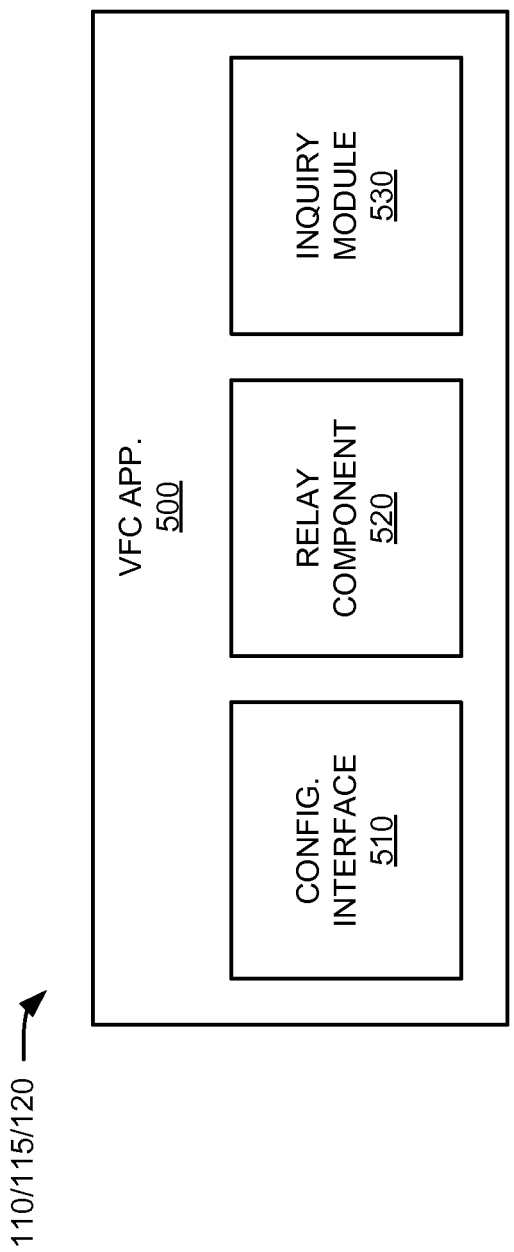
FIG. 5 is a diagram of exemplary functional components of a mobile device of the network of FIG. 1.

FIG. 5 is a diagram of exemplary functional components of mobile device 110. The functional component may be implemented by, for example, processing unit 320 in conjunction with memory 330. As shown in FIG. 5, mobile device 110 may include a VFC application 500 that includes a configuration interface 510, a relay component 520, and an inquiry module 530.

Generally, VFC application 500 may provide a user interface to configure mobile device 110 to act as a relay mechanism for signals from VFC tag 105 and to generate VFC tag inquiries. VFC application 500 may be provided to mobile device 110 from, for example, VFC server 150, another device in provider network 140, or a third-party (e.g., third-party system 190). Although described in the context of mobile device 110, VFC application 500 may also be included on other devices, such as query device 115 and third-party device 120.

Configuration interface 510 may provide a user interface to permit a user to associate particular VFC tags 105 with mobile device 110. For example, configuration interface 510 may provide a graphical user interface (GUI) or another type of interface to allow a user to determine particular VFC tags 105 from which signals can be forwarded. A user may select, for example, to only have user device 110 process/forward signals from pre-selected VFC tags 105 or VFC tags 105 associated with a particular account. Alternatively, a user may use configuration interface 510 to enable processing/forwarding of signals from any VFC tag 105.

Configuration interface 510 may generally provide a user interface to allow users to create, read, update, and/or delete entries in VFC database 160. Configuration interface 510 may provide a user interface to register VFC tags 105 for use. For example, configuration interface 510 may include an input system to associate a particular VFC tag 105 with a particular account and/or a particular object (e.g., to which VFC tag 105 may be attached). For example, in one implementation, configuration interface 510 may use a camera on mobile device 110 to scan a serial number, a bar code, or a quick response (QR) code included on VFC tag 105 to detect an identification number for a particular VFC tag 105. In another implementation, configuration interface 510 may permit a user to manually enter an identification number for a particular VFC tag 105. Identified VFC tags 105 may then be associated with a user account (e.g., based on, for example, a login procedure).

In some implementations, VFC tags 105 may also be associated with the particular object (e.g., to which VFC tag 105 may be attached) by including an image (e.g., photograph) of with the VFC tag registration information. Configuration interface 510 may forward the registration information to VFC server 105 (e.g., account manager 440) for inclusion in VFC database 160. Configuration interface 510 may subsequently permit users to access information in database 160 (e.g., based on account registrations) to view, update, or delete VFC tag entries.

Relay component 520 may permit mobile device 110 to utilize existing communications interfaces (e.g., communication interface 360) to detect/receive signals from VFC tag 105 and to forward the signals to VFC server 150. For example, relay component 520 may listen for VFC tag responses over a local wireless network (e.g., a WiFi or Bluethooth network) and decode incoming VFC tag responses. Relay component 520 may include contact information, such as a universal resource locator (URL), email address, phone number, etc. associated with VFC server 150 registrations. If relay component 520 detects a VFC tag response that is registered for processing/forwarding by mobile device 110, relay component 520 may forward the VFC tag response to VFC server 150 via a cellular network (e.g., wireless access network 130). For example, relay component 520 may forward the VFC tag response via a TCP/IP session with VFC server 150.

In one implementation, relay component 520 may identify a location (e.g., associated with mobile device 110) and may include the geographic location of mobile device 110 with the VFC tag response. Location information may include, for example, GPS coordinates or another form of global navigation satellite system (GNSS) information. Additionally, or alternatively, relay component 520 may retrieve location information in the form of cellular tower triangulation information collected from mobile device 110. In still other implementations, relay component 520 may obtain location information in the form of a fixed address or location associated with a wired network connection or IP address. For example, relay component 520 may report, as location data, a service set identifier (SSID) (e.g., associated with a local wireless router) to which mobile device 110 may be connected. In still another implementation, relay component 520 introduce a relatively small degree of random error to the location data, for security purposes, prior to sending the VFC tag response.

Inquiry module 530 may include a user interface to generate a VFC tag inquiry. Inquiry module 530 may, for example, present a searchable list of tagged items associated with a particular user account. A user may select one or more items to query. Inquiry module 530 may receive the user input and forward a VFC tag inquiry to VFC server (e.g., using an inquiry URL associated with VFC server 150). In one implementation, inquiry module 530 may include a response component to receive a response signal (e.g., from VFC server 150). For example, inquiry module 530 may identify a SMS communication from VFC server 150 with a tag identification of the requested VFC tag 105.

Although FIG. 5 shows exemplary functional components of mobile device 110, in other implementations, mobile device 110 may contain fewer, different, or additional functional components than depicted in FIG. 5.

Figure 6:
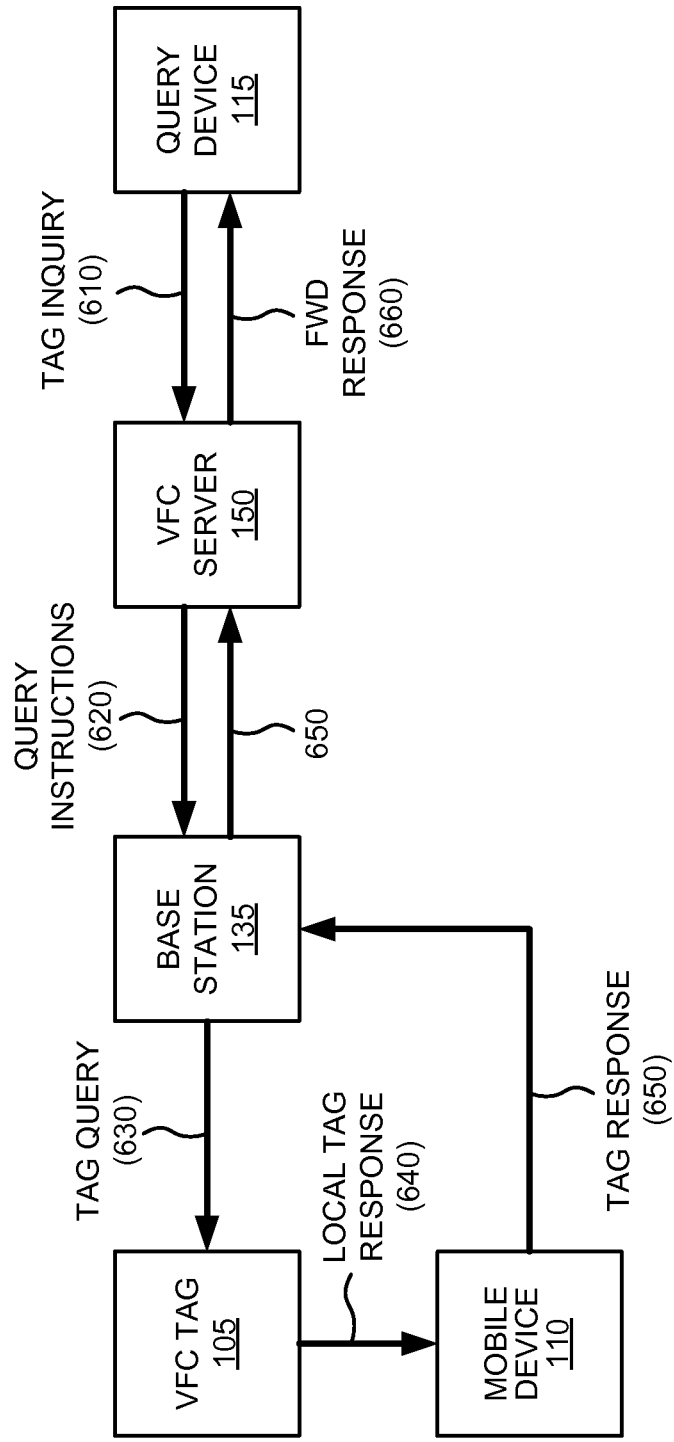
FIG. 6 is a diagram of exemplary communications among devices in a portion of the network of FIG. 1.

FIG. 6 is a diagram of exemplary communications among devices in a portion 600 network 100. Communications in FIG. 6 may represent communications to interrogate a VFC tag 105. As shown in FIG. 6, network portion 600 may include VFC tag 105, mobile device 110, query device 115, base station 135, and VFC server 150. VFC tag 105, mobile device 110, query device 115, base station 135, and VFC server 150 may include functionality described above in connection with, for example, FIGS. 1-5.

As shown in FIG. 6, query device 115 (e.g., using VFC application 500) may initiate a tag inquiry 610 for a particular VFC tag 105. Tag inquiry 610 may be provided to VFC server 150 as, for example, part of a TCP/IP session, an SMS message, an MMS message, an instant message, an email, another form of text message, etc. For example, tag query 610 may request location of a particular tag ID "23456."

VFC server 150 (e.g., inquiry manager 410) may receive tag inquiry 610 and may, in response, prepare query instructions 620. For example, VFC server 150 (e.g., tag search logic 420) may perform a lookup of the particular tag ID to identify a particular base station 135 or group of base stations 135 from which to interrogate VFC tag 105. VFC server 150 may forward query instructions 620 to base station 135 to broadcast as tag query 630. Tag query 630 may include, for example, a particular query symbol to indicate that a response from VRC tag 105 is requested. In one implementation, tag query 630 may include an indicator for a particular VFC tag 105 (e.g., tag ID "23456"). In another implementation, tag query 630 may include a generic indication that a response is requested (e.g., from any VFC tag 105 in range of tag query 630).

Tag query 630 may be broadcast, for example, over a control channel of wireless access network 130. The signal reception range of tag query 630 may be greatly enhanced over, for example, that of typical far-field communications because VFC tag 105 is tuned to a cell tower spectrum (e.g., of wireless access network 130) and tag query 630 is radiating at a higher power than is typically available to other tag systems (such as standard RFID tag readers). Signal reception range for VFC tag 105 may also benefit from the fact that the cell tower spectrum is protected and relatively free of interference (unlike standard RFID frequencies).

VFC tag 105 (e.g., cellular receiver 240) may receive tag query 630 during a listening period (e.g., as regulated by controller 210). In one implementation, if tag query 630 includes a unique tag identification (e.g., tag ID "23456"), VFC tag 105 (e.g., controller 210) may determine if tag query 630 includes a matching tag identification with VFC tag 105. If there is a match, VFC tag 105 (e.g., local wireless transmitter 230) may broadcast a local tag response 640 via a local wireless frequency using, for example, WiFi or Bluetooth protocols. Local tag response 640 may include the unique tag identifier of VFC tag 105. In another implementation, if tag query 630 includes no particular tag identification, VFC tag 105 may simply detect tag query 630 and, in response, may transmit local tag response 640 (e.g., with the unique identification number of VFC tag 105) via the local wireless frequency.

Mobile device 110 (e.g., including VFC application 500 and in receiving range of local tag response 640) may receive and identify local tag response 640. Assuming local tag response 640 includes a tag identifier that mobile device 110 is configured to process (e.g., tag ID "23456"), mobile device 110 (e.g., relay component 520) may decode local tag response 640, process local tag response 640, and relay the response back to VFC server 150 as tag response 650. Tag response 650 may include the information from local tag response 640, a timestamp, and location information from mobile device 110. Tag response 650 may be transmitted via a cellular network (e.g., via base station 135 of wireless access network 130) or another network that permits communication with VFC server 150.

VFC server 150 (e.g., inquiry manager 410) may receive tag response 650. Based, for example, on instructions/preferences in VFC database 160, VFC server 150 may provide a forwarded response 660 to query device 115. Forwarded response 660 may include the information in tag response 650, and may be provided, for example, as an SMS message, an email message, and/or another type of message. In another implementation, forwarded response 660 may be included within a session-based communication (e.g., a TCP/IP session) between query device 115 and VFC server 150.

Figure 7:
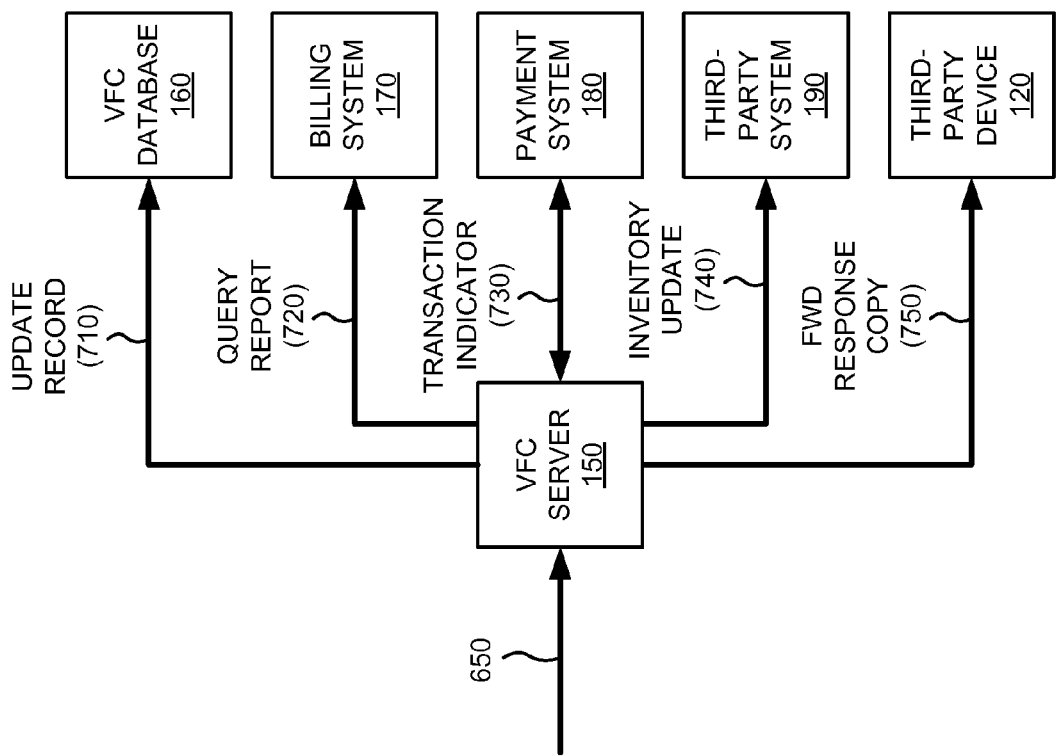
FIG. 7 is a diagram of exemplary additional communications among devices in another portion of the network of FIG. 1.

FIG. 7 is a diagram of exemplary communications among devices in another portion 700 network 100. Communications in FIG. 7 may represent communications to process responses from VFC tag 105. As shown in FIG. 7, network portion 700 may include third-party device 120, VFC server 150, VFC database 160, billing system 170, payment system 180, and third-party system 190. Third-party device 120, VFC server 150, VFC database 160, billing system 170, payment system 180, and third-party system 190 may include functionality described above in connection with, for example, FIGS. 1-6.

As shown in FIG. 7, VFC server 150 may receive tag response 650. Based on tag response 650, VFC server 150 may update 710 the corresponding record for VFC tag 105 in VFC database 160. The updated record 710 may include, for example, a response indication, a response time, and location information (e.g., as approximated by mobile device 110).

VFC server 150 may also provide a query report 720 to billing system 170. Query report 720 may include, for example, a report of a single instance of tag response 650 or a compilation of multiple tag responses 650.

VFC server 150 may provide a transaction indicator 730 to payment system 180. Transaction indicator 730 may include, for example, an indication of movement and/or return of a particular VFC tag 105. For example, VFC server 150 (e.g., transaction reporter 150) may provide transaction indictor 730 to indicate that a particular VFC tag 105 has been moved from and later returned to a general location that indicates a return of a rental item (e.g., a rental car, rented equipment, etc.). Transaction indicator 730 may provide, for example, an indication that a previously authorized transaction (e.g., a rental agreement) can be processed by payment system 180.

VFC server 150 may provide an inventory update 740 to third-party system 190. Inventory update 740 may include, for example, a report of multiple VFC tags 105 included in the same area. For example, third-party system 190 may include an inventory management system. VFC server 150 may provide (e.g., either periodically or in response to particular requests) an inventory update 740 with a list of all VFC tags 105 within a particular geographic location (e.g., that may correspond to a warehouse, campus, etc.).

VFC server 150 may provide a forwarded response copy 750 to third-party device 120. Forwarded response copy 750 may include, for example, a copy of forwarded response 660 that is provided query device 115. VFC server 150 may provide forwarded response copy 750 based on, for example, forwarding instructions associated with particular VFC tags 105 in VFC database 160.

FIG. 8 is a flow chart of an exemplary process for locating a tag over very far distances according to an implementation described herein. In one implementation, process 800 may be performed by VFC server 150. In another implementation, some or all of process 800 may be performed by another device or group of devices, including or excluding VFC server 150. For example, base station 135 or other devices in provider network 140 may perform some or all of process 800. Process 800 is described with reference to components in figures described above.

As shown in FIG. 8, process 800 may include receiving a VFC tag inquiry (block 805) and generating a VFC tag query (block 810). For example, VFC server 150 may receive tag inquiry 610 from query device 115 and identify a tag query symbol to use to interrogate the particular VFC tag 105 or group of VFC tags 105.

Process 800 may include selecting one or more broadcasting base stations (block 815), inserting a VFC tag query into broadcast signals from the one or more base stations (block 820), and determining if a response timeout occurs (block 825). For example, VFC server 150 may prepare query instructions 620 including identifying a particular base station 135 or group of base stations 135 from which to interrogate VFC tag 105 (e.g., based on information from VFC database 160). VFC server 150 may forward query instructions 620 to base station 135 to broadcast as tag query 630. Base station 135 may continue to broadcast tag query 630 for a particular timeout period or until an instruction is received from VFC server 150 indicating a response has been received.

If a response timeout does not occur (block 825-NO), process 800 may include receiving a tag response from a mobile device (block 830), and generating a forwarding message with the tag response (block 835). For example, VFC tag 105 may detect tag query 630 and may respond by transmitting local tag response 640 via a local wireless frequency. Mobile device 110 may receive local tag response 640 and relay the response back to VFC server 150 as tag response 650. VFC server 150 may receive tag response 650 and may provide a forwarded response 660 to query device 115.

If a response timeout occurs (block 825—YES), process 800 may include determining if there is an option for more base stations (block 845). For example, VFC server 150 (e.g., tag logic 420) may apply past location data or other registration information to determine a most probable base station 135 (or group of base stations 135) for an initial broadcast interrogation and for subsequent interrogations. Subsequent interrogations may be used, for example, if no response is received after an initial interrogation. In one implementation, tag logic 420 may iteratively increase the number of base stations 135 used to locate VFC tag 105 until a widest scope of coverage is achieved.

If more options for base stations exist (block 845—YES), process 800 may return to block 815. If no more options for base stations exist (block 845—NO), process 800 may include generating a message indicating no tag response was received within a timeout period (block 850). For example, VFC server 150 may fail to receive a tag response (e.g., tag response 650) within a timeout interval and may provide a response to query device 115 indicating no tag response was received.

If a forwarding message is provided (block 835) or if a message indicating no tag response was received is provided (block 850), VFC server 150 may provide a transaction indication (block 840). For example, VFC server 150 may provide one or more of query report 720, transaction indicator 730, or inventory update 740 to a respective system within or outside of provider network 140.

In systems and/or methods described herein, a network device may receive, from a user device, an inquiry for a selected VFC tag and may select, from a group of available base stations, one or more particular base stations of a wireless access network from which to broadcast a tag query for the selected VFC tag. The network device may insert the tag query into a broadcast signal of each of the one or more particular base stations. The VFC tag may receive the tag query and may transmits a local response signal over a local wireless network. A mobile device within range of the local response signal may processes the local response signal and forwards the local response signal to the network device as a tag response. The network device may receive the tag response and may send an indication of the tag response to the user device.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    selecting, by a network device and from a group of available base stations, one or more particular base stations of a wireless access network from which to broadcast a tag query for a selected very-far field communication (VFC) tag;
    inserting, into a broadcast signal of each of the one or more particular base stations, the tag query;
    receiving, by the network device and from a mobile device within range of a local wireless network signal of the selected VFC tag, a tag response that is prompted by the tag query and a local signal from the selected VFC tag, wherein the mobile device is different than the VFC tag; and
    sending, by the network device and to a user device, an indication of the tag response.

2. The method of claim 1, further comprising:
    detecting, by the selected VFC tag, the tag query; and
    broadcasting, by the selected VFC tag, the local signal via the local wireless network that is different than the wireless access network.

3. The method of claim 2, further comprising:
receiving, by the mobile device, the local signal via the local wireless network; and
sending, by the mobile device, the tag response to the network device.

4. The method of claim 1, further comprising:
adding, by the mobile device, a location indication of the mobile device, to a local tag response from the selected VFC tag, to create the VFC tag response.

5. The method of claim 1, further comprising:
identifying expiration of a waiting period for receiving a response to the tag query;
selecting, from the group of available base stations, one or more other particular base stations of a wireless access network from which to re-broadcast the tag query; and
inserting, into a broadcast signal of each of the one or more other particular base stations, the tag query.

6. The method of claim 1, wherein inserting the tag query includes inserting a tag query symbol into a control channel of the wireless access network.

7. The method of claim 1, further comprising:
receiving, from the user device, an inquiry for the selected VFC tag.

8. The method of claim 1, further comprising:
storing, in a database, a record of the tag response, wherein the record includes the location information and time information.

9. The method of claim 1, further comprising:
forwarding, to one of a billing system, a payment system, or a third-party system, an indication of the tag response.

10. The method of claim 1, wherein sending the indication of the tag response includes:
providing the tag response via a short messaging service (SMS) message or an email message.

11. A system, comprising:
a very-far field communication (VFC) tag including:
a receiver to listen for a tag query provided via a wireless access network, and
a transmitter to provide a local signal, in response to the tag query, over a local wireless network that is different than the wireless access network;
a mobile device configured to:
receive the local signal from the VFC tag, and
send a tag response, based on the local signal, to a network device; and
the network device configured to:
select from a group of available base stations, a particular base station of the wireless access network from which to broadcast a tag query for the VFC tag,
cause insertion of the tag query into a broadcast signal associated with the particular base station,
receive the tag response from the mobile device, and
send, to a user device, an indication of the tag response.

12. The system of claim 11, wherein the VFC tag further comprises:
a power source, and
a controller to manage time intervals for listening by the receiver.

13. The system of claim 11, wherein the mobile device includes one of:
a smart phone,
a radiotelephone,
a personal communications system (PCS) terminal,
a personal digital assistant (PDA),
a wireless device,
a computer,
a global positioning system (GPS) device, or
a gaming device.

14. The system of claim 11, wherein the network device is further configured to:
receive, from the user device, registration information for the VFC tag, wherein the registration information includes contact information for the user device to receive the indication of the tag response.

15. The system of claim 11, wherein, when sending the tag response, the mobile device is further configured to:
add a location indication of the mobile device to information in the local signal to create the VFC tag response.

16. The system of claim 11, wherein the wireless access network is a cellular band network, and wherein the local wireless network is one of:
a WiFi protocol network, or
a Bluetooth protocol network.

17. A method, comprising:
receiving, by a mobile device and via a local wireless signal, a response message from a very-far field communication (VFC) tag, wherein the response message is responsive to a tag query provided through base station of a cellular network, and wherein the response message includes a unique identifier for the VFC tag;
adding, by the mobile device and to the response message, location information associated with the mobile device to create a tag response; and
sending, by the mobile device and to a network device beyond the range of the local wireless signal, the tag response.

18. The method of claim 17, wherein the location information includes one of:
Global Positioning System (GPS) coordinates,
cell-tower triangulation data, or
identification information of a fixed device with which the mobile device is in local communication.

19. The method of claim 17, further comprising:
receiving, from the network device, an application that includes a user interface to restrict sending of tag responses from the mobile device to sending only tag responses relating to particular VFC tags; and
determining, by the mobile device, that the unique identifier in the response message is from one of the particular VFC tags.

20. The method of claim 17, wherein the receiving, adding, and sending are performed by the mobile device without additional input from a user of the mobile device.

* * * * *